US012630718B2

(12) United States Patent

Seki et al.

(10) Patent No.: US 12,630,718 B2

(45) Date of Patent: May 19, 2026

(54) FLOW MOLDING WOODY MATERIAL AND FLOW MOLDING MATERIAL INCLUDING SAME AND WOODY MOLDED BODY

(71) Applicant: NATIONAL INSTITUTE OF ADVANCED INDUSTRIAL SCIENCE AND TECHNOLOGY, Chiyoda-ku (JP)

(72) Inventors: Masako Seki, Nagoya (JP); Mitsuru Abe, Nagoya (JP); Tsunehisa Miki, Nagoya (JP)

(73) Assignee: NATIONAL INSTITUTE OF ADVANCED INDUSTRIAL SCIENCE AND TECHNOLOGY, Chiyoda-ku (JP)

( * ) Notice: Subject to any disclaimer, the term of this patent is extended or adjusted under 35 U.S.C. 154(b) by 783 days.

(21) Appl. No.: 17/999,119

(22) PCT Filed: Jun. 30, 2021

(86) PCT No.: PCT/JP2021/024777

§ 371 (c)(1),
(2) Date: Nov. 17, 2022

(87) PCT Pub. No.: WO2022/004796

PCT Pub. Date: Jan. 6, 2022

(65) Prior Publication Data

US 2023/0193036 A1      Jun. 22, 2023

(30) Foreign Application Priority Data

Jun. 30, 2020     (JP) .................................. 2020-113430

(51) Int. Cl.
C08L 97/00        (2006.01)
B27N 3/10         (2006.01)
C08L 97/02        (2006.01)

(52) U.S. Cl.
CPC ................ *C08L 97/02* (2013.01); *B27N 3/10* (2013.01)

(58) Field of Classification Search
None
See application file for complete search history.

(56) References Cited

U.S. PATENT DOCUMENTS

| | | | |
|---|---|---|---|
| 10,538,012 | B2 | 1/2020 | Boitouzet et al. |
| 11,254,026 | B2 | 2/2022 | Boitouzet et al. |
| 2022/0134596 | A1 | 5/2022 | Boitouzet et al. |

FOREIGN PATENT DOCUMENTS

| | | |
|---|---|---|
| CN | 108367451 A | 8/2018 |
| JP | 8-332032 A | 12/1996 |

(Continued)

OTHER PUBLICATIONS

Chinese Office Action issued Apr. 9, 2024 in Chinese Application No. 202180036195.3, with English Machine translation, 12 pgs.

(Continued)

*Primary Examiner* — Stefanie J Cohen
(74) *Attorney, Agent, or Firm* — Oblon, McClelland, Maier & Neustadt, L.L.P.

(57) ABSTRACT

A woody material, where a ratio (HB/HA) between a height (HA) of an absorption peak derived by C—H stretching vibration detected at a wavenumber from 2850 cm-1 to 2950 cm-1 and a height (HB) of an absorption peak derived by skeletal vibration of an aromatic ring detected at a wavenumber from 1480 cm-1 to 1540 cm-1 is 1.10 or less in an ATR spectrum of an inside or a surface of the woody material by an infrared spectroscopic analysis method.

7 Claims, 12 Drawing Sheets

(56)                     References Cited

FOREIGN PATENT DOCUMENTS

| | | |
|---|---|---|
| JP | 2006-247974 A | 9/2006 |
| JP | 2007-261159 A | 10/2007 |
| JP | 2010-155394 A | 7/2010 |
| JP | 2018-196947 A | 12/2018 |
| JP | 2019-188648 A | 10/2019 |

OTHER PUBLICATIONS

Chinese Office Action issued Nov. 24, 2023 in Chinese Patent Application No. 202180036195.3 (with unedited computer-generated English translation), 10 pages.
International Search Report issued Sep. 14, 2021 in PCT/JP2021/024777 filed on Jun. 30, 2021, citing documents 15-19, 24 & 25, 3 pages.
Masahiko Kobayashi et al., "Quantification of polypropylene in wood plastic composites (WPCs) by means of differential scanning calorimetry and infrared spectroscopy"., Mokuzai Hozon (Wood Protection) vol. 39, No. 1, 2013, 10 pages.
Hyoe Hatakeyama, "Lignin Reactions in Bleaching Process", Japan Tappi Journal, vol. 20, No. 11, 1966, 16 pages (with Partial English Translation).
Combined Chinese Office Action and Search Report issued on Jun. 29, 2023 in Chinese Patent Application No. 202180036195.3 (with unedited computer-generated English translation of Office Action), citing document 15 therein, 12 pages.

Wave number (cm⁻¹)

Wave number (cm⁻¹)

FLOW MOLDING WOODY MATERIAL AND FLOW MOLDING MATERIAL INCLUDING SAME AND WOODY MOLDED BODY

CROSS REFERENCE TO RELATED APPLICATIONS

This application is a National Stage entry under 35 U.S.C. § 371 of PCT/JP2021/024777, filed on Jun. 30, 2021, and claims priority to Japanese Patent Application No. 2020-113430, filed on Jun. 30, 2020, the entire contents of which are incorporated herein by reference.

TECHNICAL FIELD

The present invention relates to a woody material for wood flow molding that is used in a method for manufacturing a woody molded article by applying pressure to form the woody molded article, a wood flow molding material containing the same, and a woody molded article obtained using the wood flow molding material.

BACKGROUND ART

As a manufacturing method of a molded body having wood appearance (a woody molded article), wood flow molding is used (see Patent Literatures 1 and 2). This wood flow molding is a technique in which a lump-shaped woody material is accommodated in an arbitrary mold, and is flow-filled and molded in the mold by applying pressure. As compared with a method in which lumens of xylem cells are densified by closing to change the shape as in compression processing, in the wood flow molding, the lump-shaped woody material is deformed by a position change due to a slippage phenomenon between xylem cells, such that amount of deformation can be made larger. Plastic processing of a woody material having an arbitrary shape, which has been impossible only by conventional compression processing, can be realized in the wood flow molding. Moreover, since damage of fibrous xylem cells is suppressed, a reinforcing effect is imparted to the obtained woody molded article.

PRIOR ART LITERATURE

Patent Literature

Patent Literature 1: P 2006-247974 A
Patent Literature 2: JP 2010-155394 A

SUMMARY OF INVENTION

Problems That the Invention is to Solve

In order to manufacture a woody molded article while improving productivity, fluidity of a woody material that deforms when pressure is applied is a key factor. An object of the present invention is to provide a woody material for wood flow molding leading to a wood flow molding material having good fluidity when pressure is applied and excellent productivity of a woody molded article. Another object of the present invention is to provide a wood flow molding material having excellent productivity of a woody molded article by wood flow molding, a manufacturing method of the same, and a woody molded article having wood appearance and excellent shape stability.

Means for Solving the Problems

Xylem cells contained in the woody material are composed of cellulose, hemicellulose, and lignin, and have a structure in which crystalline cellulose microfibrils in which cellulose is aggregated and oriented in a fibrous form construct a cell skeleton in a helical winding structure, and lignin is filled between microfibrils via hemicellulose.

The present inventors have found that a woody material having a specific absorption pattern in an infrared absorption spectrum, which is considered to be caused by decomposition or removal of a part of lignin, provides a molding material excellent in productivity of a woody molded article by wood flow molding, because the wood flow molding utilizes compression of xylem cells constituting the woody material by pressurization and there is a restriction on the amount of deformation.

The present invention is as follows.

(1) A woody material for wood flow molding that is used in a method for manufacturing a woody molded article by applying pressure to form the woody molded article, characterized in that a ratio ($H^B/H^A$) between a height ($H^A$) of an absorption peak derived by C—H stretching vibration detected at a wavenumber from 2850 cm$^{-1}$ to 2950 cm$^{-1}$ and a height ($H^B$) of an absorption peak derived by skeletal vibration of an aromatic ring detected at a wavenumber from 1480 cm$^{-1}$ to 1540 cm$^{-1}$ is 1.10 or less in an ATR spectrum of an inside or a surface of the woody material by an infrared spectroscopic analysis method.

(2) The woody material for wood flow molding according to (1) above, wherein a lignin content by an acetyl bromide method is 3% or more by mass.

(3) The woody material for wood flow molding according to (2) above, wherein the lignin content is 20% or more by mass.

(4) The woody material for wood flow molding according to (2) above, wherein the lignin content is 15% or less by mass.

(5) A wood flow molding material comprising the woody material for wood flow molding according to any one of (1) to (4) above.

(6) The wood flow molding material according to (5) above, further comprising a resin.

(7) A manufacturing method of the wood flow molding material according to (6) above, comprising impregnating the woody material for wood flow molding according to any one of (1) to (4) above with a resin.

(8) A woody molded article obtained using the wood flow molding material according to (5) above.

(9) A woody molded article obtained using the wood flow molding material according to (6) above.

Effects of the Invention

According to the woody material for wood flow molding of the present invention, slippage between xylem cells during the wood flow molding can be improved, so that a molding material excellent in productivity of a woody molded article can be provided.

According to the woody material for wood flow molding having a lignin content of 20% or more by mass, the woody material for wood flow molding is excellent in fluidity, so that it is possible to more greatly deform the woody molded article at the time of forming the woody molded article, and it is possible to efficiently manufacture the woody molded article having a desired shape.

According to the woody material for wood flow molding having a lignin content of 15% or less by mass, a woody molded article excellent in mechanical properties can be obtained.

Since the wood flow molding material of the present invention is excellent in fluidity when pressure is applied, it is useful for manufacturing a woody molded article having wood appearance and excellent shape stability by wood flow molding. Since the fibers contained in the woody material flow irregularly without being divided when pressure is applied to the woody material in the wood flow molding, the resulting woody molded article contains fibers that have substantially the same length as that of the woody material while being dispersed, which can have a reinforcing effect. The wood flow molding material of the present invention may further contain a resin or a precursor thereof. Since it is possible to reduce content ratio of the resin as compared with a conventionally known composition containing a thermoplastic resin and wood powder, the obtained woody molded article is highly useful for resource and environmental problems related to waste and recycling of wood resources as compared with a resin molded body obtained by including such composition.

According to the manufacturing method of a wood flow molding material of the present invention, for example, a wood flow molding material that has excellent productivity of a woody molded article having a three-dimensional shape can be efficiently manufactured.

The woody molded article of the present invention is excellent in shape stability.

DESCRIPTION OF EMBODIMENTS

The woody material for wood flow molding of the present invention is a woody material used in a method for manufacturing a woody molded article by applying pressure to form the woody molded article, and is characterized in that a ratio ($H^{B}/H^{A}$) between a height ($H^{A}$) of an absorption peak derived by C—H stretching vibration detected at a wavenumber from 2850 $cm^{-1}$ to 2950 $cm^{-1}$ and a height ($H^{B}$) of an absorption peak derived by skeletal vibration of an aromatic ring detected at a wavenumber from 1480 $cm^{-1}$ to 1540 $cm^{-1}$ is 1.10 or less in an ATR spectrum (an infrared absorption spectrum obtained by an ATR method) of an inside or a surface of the woody material by an infrared spectroscopic analysis method. A measurement sample used for obtaining the ATR spectrum is, for example, a dried material obtained by being placed in a blower dryer and dried at a temperature of 105° C. until reaching a constant weight. A prism used for obtaining the ATR spectrum is not particularly limited, and may be any of KRS-5, ZnSe, Ge, $BaF_2$, diamond, and the like.

The woody material for wood flow molding of the present invention is derived from a plant body having cell walls, such as wood (softwood trees such as Japanese cedar, Japanese cypress, and pine; broad-leaved tree such as poplar, beech, oak, or birch), bamboo, hemp (jute, kenaf, flax, hemp, ramie, sisal, and the like), and herbs, and may be any of the plant body itself (sawn boards, sliced sheets, sliced veneers, and the like), a waste material thereof, or a chemically treated product thereof. Shape and size of the woody material for wood flow molding of the present invention are not particularly limited. Since wood flow molding is a molding method in which a molded body is usually manufactured in a state where the wood flow molding material is accommodated in the mold, it is preferable that the woody molded article has a chip shape containing fibers having a length of at least 5 mm or more, in a case where a woody molded article excellent in shape stability is to be obtained using a woody material for wood flow molding as a wood flow molding material. The shape of the woody material may be either a regular shape such as a sliced sheet and an irregular shape.

Figure 1:
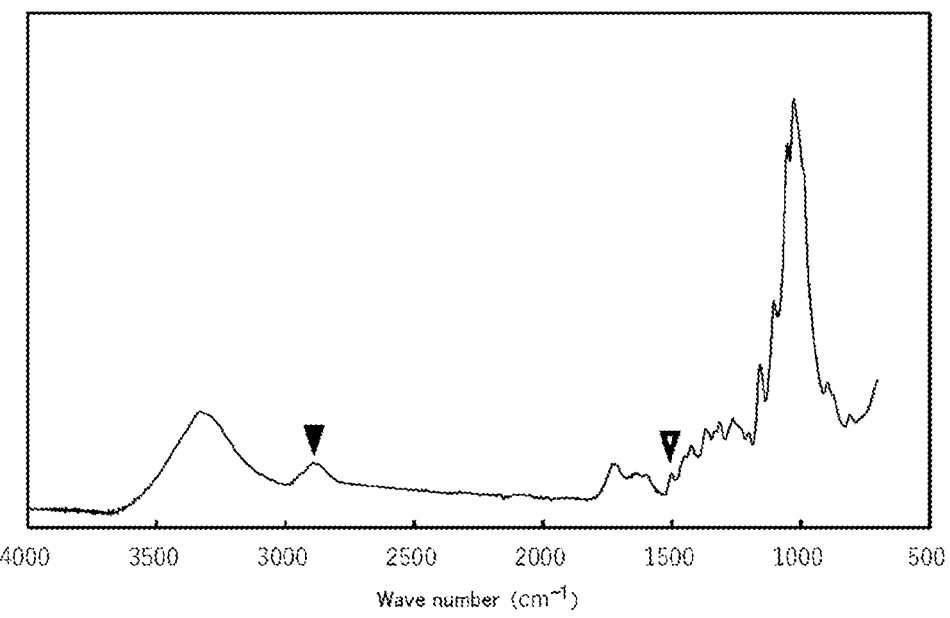
FIG. 1 is an example of an infrared absorption spectrum (ATR) of a woody material for wood flow molding of the present invention.
Figure 2:
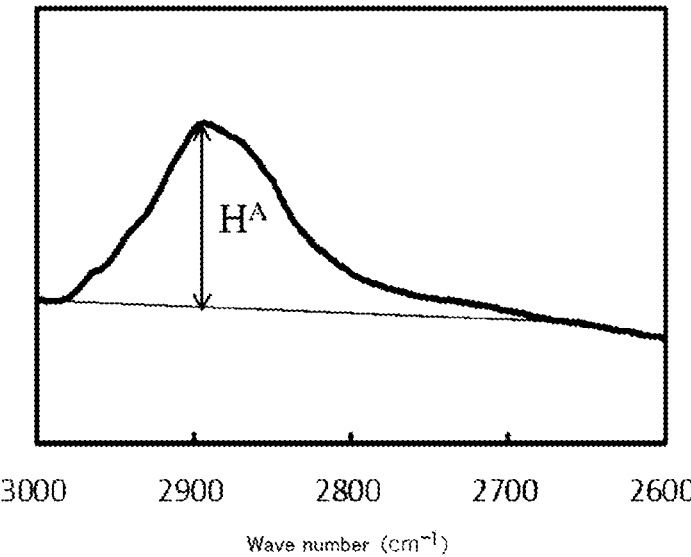
FIG. 2 is an explanatory diagram of a method for determining the height of an absorption peak detected at a wavenumber from 2850 $cm^{-1}$ to 2950 $cm^{-1}$.
Figure 3:
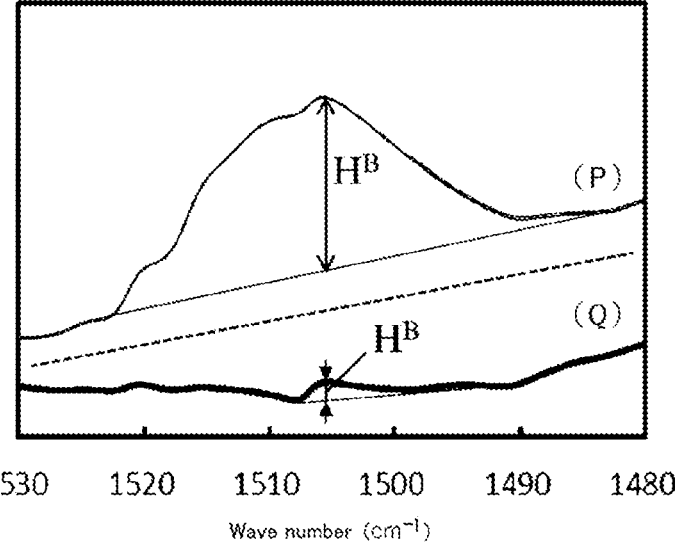
FIG. 3 is an explanatory diagram of a method for determining the height of an absorption peak detected at a wavenumber from 1480 $cm^{-1}$ to 1540 $cm^{-1}$.

As described above, the woody material for wood flow molding of the present invention has a ratio of the heights of two peaks in the ATR spectrum within a specific range. For example, this ATR spectrum is shown in FIG. 1, and has an absorption peak indicated by a solid inverted triangle derived by the C—H stretching vibration detected at a wavenumber of 2850 cm$^{-1}$ to 2950 cm$^{-1}$ and an absorption peak indicated by an open inverted triangle derived by the skeletal vibration of the aromatic ring detected at a wavenumber of 1480 cm$^{-1}$ to 1540 cm$^{-1}$. These absorption peaks are peaks derived from cellulose, hemicellulose, and lignin (or decomposition products thereof), in particular, constituting xylem cells of a plant body. Among them, the absorption peak indicated by the open inverted triangle detected at a wavenumber from 1480 cm$^{-1}$ to 1540 cm$^{-1}$ is derived only from the lignin (or the decomposition products thereof), and is a peak related to the effect of the present invention. In the present invention, the ratio of peak heights ($H^B/H^A$ ratio) is set to 1.10 or less because a wood flow molding material having excellent productivity of a woody molded article by wood flow molding is provided. The ratio is preferably 1.00 or less, and the lower limit is usually 0.05 and preferably 0.20. Note that the height of each peak is a length measured from an intersection to a vertex of the peak after drawing tangents at both ends of the peak as the baseline, drawing a perpendicular from the vertex of the peak with respect to the baseline, and determining the intersection with the baseline (see FIGS. 2 and 3). Depending on the type of woody material, infrared absorption derived by the skeletal vibration of the aromatic ring detected at a wavenumber from 1480 cm$^{-1}$ to 1540 cm$^{-1}$ may be small, and thus FIG. 3 illustrates two examples of determining the height ($H^B$). (P) in the upper part of FIG. 3 illustrates a determination method in a case of the spectrum obtained when the amount of lignin (or the decomposition products thereof) is large, and (Q) in the lower part illustrates a determination method in a case of the spectrum obtained when the amount of lignin (or the decomposition products thereof) is small.

Since the woody material for wood flow molding of the present invention has, as described above, an absorption peak detected at a wavenumber from 1480 cm$^{-1}$ to 1540 cm$^{-1}$ in the ATR spectrum, the present inventors consider that the woody material contains the lignin (or the decomposition products thereof). However, in the woody material for wood flow molding of the present invention, it is preferable that the above ratio of $H^B/H^A$ satisfies 1.10 or less as a result of treating (removing or decomposing) a part of lignin from the plant body described above. The above plant body (before treatment) usually contains lignin, but the effect of the present invention cannot be obtained with a woody material having the above ratio of $H^B/H^A$ in the ATR spectrum of more than 1.10. The lignin content is not necessarily low, and is preferably 3% or more by mass, more preferably 5% or more by mass, and particularly 7% or more by mass. The lignin content may be 20% or more by mass. When the lignin content is 20% or more by mass, mechanical properties of the woody molded article obtained are equivalent to those of an untreated woody material. But since the fluidity of the woody material is excellent, a larger deformation can be applied than that of the untreated woody material, and a molding material excellent in productivity of a woody molded article can be obtained. When the lignin content is 3% or more by mass and 15% or less by mass, the mechanical properties of the woody molded article obtained are significantly improved as compared with the untreated woody material, and a molding material having excellent productivity of a woody molded article can be obtained. Upper limit of the lignin content is preferably 15% by mass from viewpoint of mechanical characteristics of the woody molded article obtained. When the mechanical characteristics may be equivalent to those of the untreated woody material, the upper limit may be more than 15% by mass, and is usually the content of the woody material itself before delignification treatment. In other words, even in a state where there is almost no quantitative change due to the delignification treatment, the effect of the present invention can be obtained as long as the $H^B/H^A$ ratio is 1.10 or less. A uniform upper limit value cannot be indicated because the upper limit value varies depending on the type of woody material, growth environment, different sites within the same individual, and the like. The above lignin content can be measured by an acetyl bromide method. The acetyl bromide method is a method in which a powdered woody material is decomposed with an acetic acid solution of acetyl bromide, and the amount of dissolved lignin is converted by ultraviolet absorbance (see K. Iiyama et al. "An improved acetyl bromide procedure for determining lignin in woods and wood pulps", Wood Science and Technology, 1988, 22: pp. 271-280).

When the above plant body is subjected to lignin treatment such as a conventionally known Klaudiz method, a Wize method, a kraft pulping method, a soda method, a phenol pulping method, an organic acid pulping method, an organosols pulping method, an ASAM method, or a bleaching treatment, degree of condensation of lignin is reduced and a relaxed state can be formed in the cell walls. Accordingly, the woody material thus obtained can further improve the slippage between the xylem cells in the woody material during wood flow molding, as compared with the woody material obtained via a method in which water is added to an untreated plant body or a method in which strain is applied to the untreated plant body in order to relax bonds between polymer chains in hemicellulose and lignin, which are amorphous polymers, to develop the fluidity, as in the method described in P 2006-247974 A, for example. Then, it is possible to provide a wood flow molding material having excellent productivity of a woody molded article.

The wood flow molding material of the present invention is a molding material containing the woody material for wood flow molding of the present invention described above, which is used for manufacturing a woody molded article by wood flow molding. The wood flow molding material of the present invention may be a composite composed of the woody material for wood flow molding of the present invention described above and water and/or an organic component contained (attached) in at least one of the surface and the inside of the woody material. In this composite, the content ratio of water and/or the organic component to the whole composite is preferably in a range from 1% to 70% by mass, and more preferably from 5% to 40% by mass.

The organic component in the above composite is preferably a resin or a precursor thereof. The precursor may be either a low molecular weight compound or a high molecular weight compound. The above resin may contain either a thermoplastic resin or a curable resin. The organic component in the above composite may be of only one type or two or more types.

Examples of the thermoplastic resin include an acrylic resin; a polyolefin such as polyethylene and polypropylene; a cyclic polyolefm; polyethylene glycol; polystyrene; polyvinyl chloride; polyvinylidene chloride; polyvinyl acetate; polytetrafluoroethylene; an ABS resin; an AS resin; a polyamide such as nylon; a polyacetal; a polycarbonate; a modified polyphenylene ether; a polyester resin such as polybutylene terephthalate and polyethylene terephthalate; a polyphenylene sulfide; a polysulfone; a polyether sulfone; an amorphous polyarylate; a liquid crystal polymer; a polyether ether ketone; a polyimide; a polyamideimide; and the like.

Examples of the curable resin include a phenol resin, an epoxy resin, an unsaturated polyester, a urea resin, a melamine resin, a diallyl phthalate, a silicon resin, a vinyl ester resin, a polyimide, a polyurethane, and the like. When the curable resin is used, a curing agent may be used in combination.

The above resin may further contain a plasticizer, an antioxidant, an ultraviolet absorber, an anti-aging agent, a filler, an antibacterial agent, an antiseptic agent, an antistatic agent, and the like.

A preferred embodiment of the wood flow molding material of the present invention is a composite in which water and/or the organic component is contained in the cell walls of a woody material having cell walls in a relaxed state. A method for manufacturing the wood flow molding material including such a composite is not particularly limited. In a case where a composite containing only water is manufactured, a method including a process of bringing saturated steam into contact with the woody material for wood flow molding of the present invention described above, a method including a process of conditioning the woody material for wood flow molding of the present invention described above under a constant relative humidity environment, and the like can be used. In a case where a composite containing a resin is manufactured, the method can include a process of impregnating the woody material for wood flow molding of the present invention described above with the resin (hereinafter, referred to as an "impregnation process"). Hereinafter, the manufacturing method of the present invention including this impregnation process will be described.

In this impregnation process in the manufacturing method of the present invention for manufacturing a wood flow molding material including a composite containing a resin, as long as the woody material is impregnated with the resin, any one of (1) only the resin, (2) a liquid containing the resin and a medium that dissolves the resin, and (3) a liquid containing the resin and a medium that does not dissolve and disperses the resin may be used. Among them, the liquids (2) and (3) are preferably used. The medium of the resin-containing liquid in (2) and (3) preferably contains water from viewpoint of permeability into the cell walls, but in a case where the resin is not dissolved in water, the medium in which the resin is dissolved may be appropriately selected.

Figure 4:
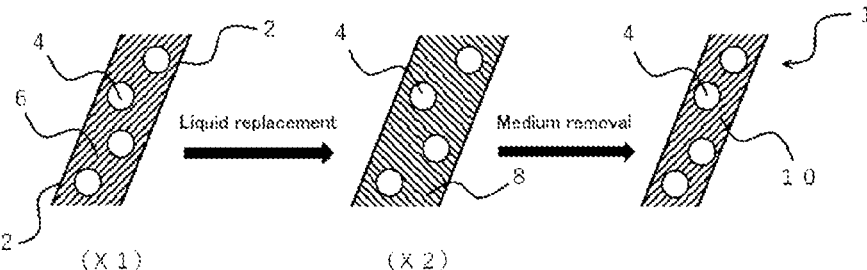
FIG. 4 is an explanatory view of a solution replacement method for manufacturing a wood flow molding material containing a resin.
Figure 5:
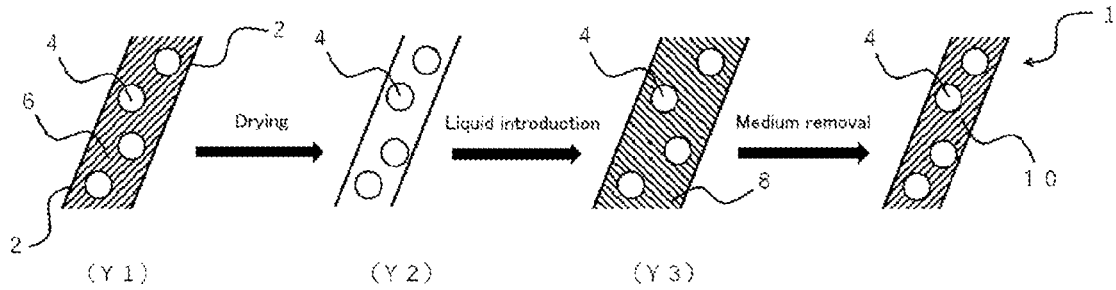
FIG. 5 is an explanatory view of a drying/impregnation method for manufacturing a wood flow molding material containing a resin.

In the impregnation process, it is preferable to apply the solution replacement method shown in FIG. 4 or the drying/impregnation method shown in FIG. 5.

In the solution replacement method of FIG. 4, a woody material (X1) that contains a lignin 4 and a water 6 between cellulose fibers 2 and is swollen with water is immersed in, for example, a resin-containing liquid, and is subjected to liquid replacement so as to contain a resin between the cellulose fibers 2 under reduced pressure conditions, cooling/heating conditions, or the like as necessary to obtain a woody material (X2) containing a resin-containing liquid 8 between the cellulose fibers 2. Then, the medium of the resin-containing liquid 8 is removed, whereby a wood flow molding material 1 containing a resin 10 between the cellulose fibers 2 can be obtained. Immersion time in the case of immersing the woody material (X1) in the resin-containing liquid depends on the shape, size, or mass of the woody material (X1), but is usually in a range from 1 to 200 hours per 10 grams of the woody material in a dry state.

In the drying/impregnation method of FIG. 5, a woody material (Y1) that contains the lignin 4 and the water 6 between the cellulose fibers 2 and is swollen with water is dehydrated by air blow drying, reduced pressure drying, high temperature drying, or the like to obtain a woody material (Y2) having a water content of 10% or less by mass, for example, and then immersed in a resin-containing liquid, for example, and subjected to liquid injection under reduced pressure conditions, pressurization conditions, cooling/heating conditions, or the like as necessary so as to contain a resin between the cellulose fibers 2 to obtain a woody material (Y3) containing the resin-containing liquid 8 between the cellulose fibers 2. Then, the medium of the resin-containing liquid 8 is removed, whereby the wood flow molding material 1 containing the resin 10 between the cellulose fibers 2 can be obtained. The immersion time in the case of immersing the woody material (Y2) in the resin-containing liquid depends on the shape, size, or mass of the woody material (Y2), but is usually in a range from 1 minute to 24 hours per 10 grams of the woody material in the dry state.

In any of the solution replacement method and the drying/impregnation method described above, water or a used medium may be contained (remain) between the cellulose fibers 2 of the wood flow molding material 1. FIGS. 4 and 5 are pattern diagrams of a method for impregnating a space between the cellulose fibers 2 in the cell walls with a resin, but the obtained wood flow molding material 1 may be one in which a resin is attached to the surface of the cell walls or a part or the entire surface of the woody material.

A woody molded article having wood appearance and excellent shape stability can be manufactured using the wood flow molding material of the present invention. Here, the "excellent shape stability" means a state in which the shape immediately after molding is maintained even for one month or longer after molding.

Figure 21:
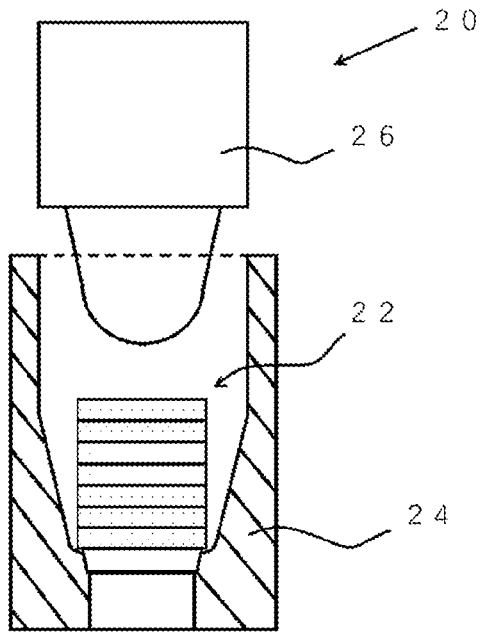
FIG. 21 is a schematic view illustrating a rear extrusion molding machine used for manufacturing a container-shaped woody molded article in EXAMPLES.

For example, as shown in FIG. 21, a wood flow molding material 22 made of a small piece of woody material is supplied to a mold 24, pressure is applied using a punch 26, a shear force is applied to cells (the cell walls and intercellular layers), a plastic flow due to intercellular sliding is generated, the cells are moved to a predetermined free space in the mold 24, the free space is filled, and shaping is performed. In this way, a woody molded article having a desired shape, size, and surface property similar to those obtained using a resin or a metal can be obtained. When pressure is applied, heating may be performed according to a configuration of the wood flow molding material. As described above, during manufacturing the woody molded article, molding temperature can be appropriately set, and in addition, pressure at the time of pressurization, raw material water content, molding time, and the like can be set to control the properties and the like of the woody molded article.

The wood flow molding material 22 used in the manu-facturing of the woody molded article may be made of a woody material having the same configuration, or may be made of a plurality of kinds of woody materials having different configurations. In the latter case, for example, (1) a method of accommodating a mixture including a plurality of types of woody materials in the mold, and (2) a method of accommodating a first woody material and a second woody material in the mold in a state of uneven distribution may be applied. According to the method of (2) described above, a difference in color of each woody material, for example, a difference in brightness and darkness due to a difference in plant bodies or in $H^B/H^A$ ratio between woody liquid heated in advance was permeated by reduced pressure injection and then a delignification treatment was per-formed, such that the treatment liquid quickly reached the inside of the small pieces of Japanese cypress and the reaction proceeded. After the delignification treatment, the reaction was stopped by immersion in water at room tem-perature.

In order to grasp quantitative changes of lignin with respect to the delignification treatment time in the obtained woody material, a weight reduction rate was calculated from dry weights before and after the treatment. Drying condi-tions are air blow drying at 105° C. for 24 hours before the treatment, and air drying at room temperature, air blow drying at 35° C. for 24 hours, air blow drying at 50° C. for 18 hours, and air blow drying at 105° C. for 3 hours after the treatment. In addition, the weight reduction rate for the small pieces of Japanese cypress that were immersed in, instead of the treatment liquid for delignification, water at room tem-perature for 96 hours or longer (A0) were also obtained. These results are shown in Table 1.

TABLE 1

| | Woody material | | | | | | | |
| | A0 | A1 | A2 | A3 | A4 | A5 | A6 | A7 |
|---|---|---|---|---|---|---|---|---|
| Delignification treatment time | 0 (water only) | 10 min | 30 min | 1 h | 3 h | 6 h | 24 h | 96 h |
| Weight reduction rate (%) | 1.15 | 1.68 | 1.93 | 3.12 | 8.76 | 12.7 | 31.6 | Unmeasured | materials derived from the same plant body may cause the woody molded article to have a different appearance (a wooden pattern or the like) in one molded body.

Since the wood flow molding material of the present invention may be impregnated with a resin as necessary, it is possible to efficiently manufacture a woody molded article having good physical properties or mechanical properties and small performance variations. Due to excellent fluidity, a molded body having a three-dimensional shape can also be manufactured.

Accordingly, the woody molded article of the present invention provides a fundamental solution to resource prob-lems and waste problems through industrial utilization of wood flow molding using a plant-based material that can be recycled as a raw material.

EXAMPLES

Hereinafter, the present invention will be described more specifically with reference to Examples. However, since these examples merely illustrate some embodiments of the present invention, the present invention should not be inter-preted as being limited to these Examples.
1. Production and Evaluation of Woody Material (1)

Sapwood (shirata) of Japanese cypress was made into small pieces having a size of 5 mm (L: fiber direction)×5 mm (T: tangential direction)×5 mm (R: radial direction), and a delignification treatment was performed on a plurality of the small pieces for a treatment time of 10 minutes, 30 minutes, 1 hour, 3 hours, 6 hours, 24 hours, or 96 hours to obtain woody materials (A1) to (A7). The delignification treatment was performed according to a Klaudiz method (Takahide Sakaguchi et al. "Wood Chemistry", Buneido Publishing Co., Ltd., 1985, pp. 69-70) at a concentration of a sodium chlorite aqueous solution of 4% and a temperature of 45° C., while changing a treatment time. A treatment When the delignification treatment time was up to 30 minutes, increase in the weight reduction rate was small (within 1%), and change in residual lignin amount was small. When the delignification treatment time was 1 hour or longer, the weight reduction rate remarkably increased and the residual lignin amount decreased with increasing treat-ment time. Since the lignin amount contained in Japanese cypress is in a range from 25% to 32% by mass (Nobuhiko Migita et al. "Wood Chemistry (Vol. 1)", KYORITSU SHUPPAN Co., Ltd., 1968, pp. 72), it is considered that when the delignification treatment is performed for 24 hours or longer, the residual lignin amount in the obtained woody material is de minimis.

As for the sizes of the obtained woody materials (A1) to (A7), in a water-saturated state (a water-swollen state) immediately after the treatment, the longer the treatment time, the more swollen the woody materials became than that before the treatment, and there was a brightening tendency. In the diy state, the longer the treatment time, the more shrunk the woody materials than that before the treatment, and there was a brightening tendency. In all the woody materials (A1) to (A7), a tissue structure (arrange-ment of cells, and the like) of the woody material before the treatment was almost maintained.

Subsequently, for the woody material (A0) after water treatment and the woody materials (A1) to (A7) after the delignification treatment, the infrared absorption spectrum (ATR) was measured for each of an inner cross section (a plate surface) and a wood chip surface when the material was cut in half in the fiber direction. The measuring device was an infrared spectrophotometer named "NICOLET 6700 FT-IR" (model name) manufactured by Thermo Fisher Sci-entific Inc., and diamond was used as a prism. A measure-ment wavenumber range was set to a range from 4000 cm$^{-1}$ to 500 cm$^{-1}$.

Figure 6:
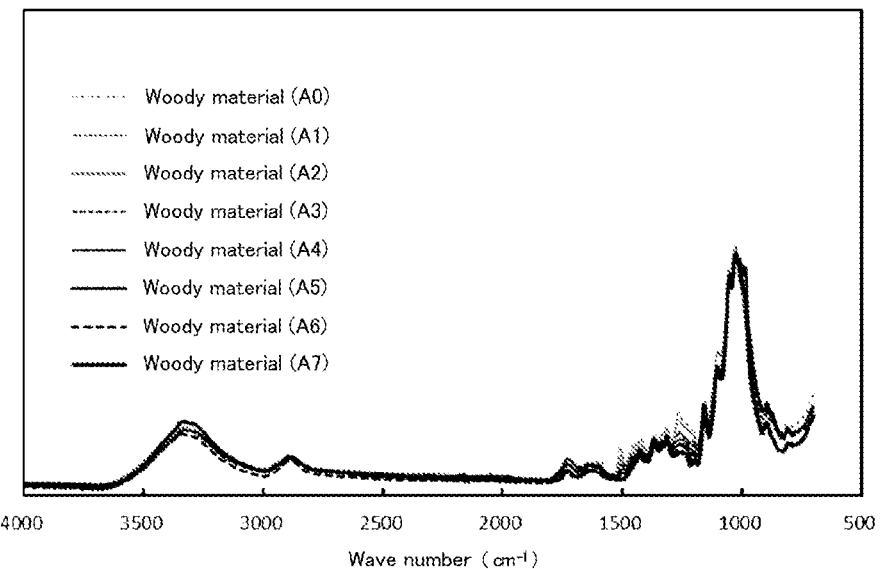
FIG. 6 illustrates ATR spectra of woody materials (A0) to (A7) obtained in EXAMPLES.
Figure 7:
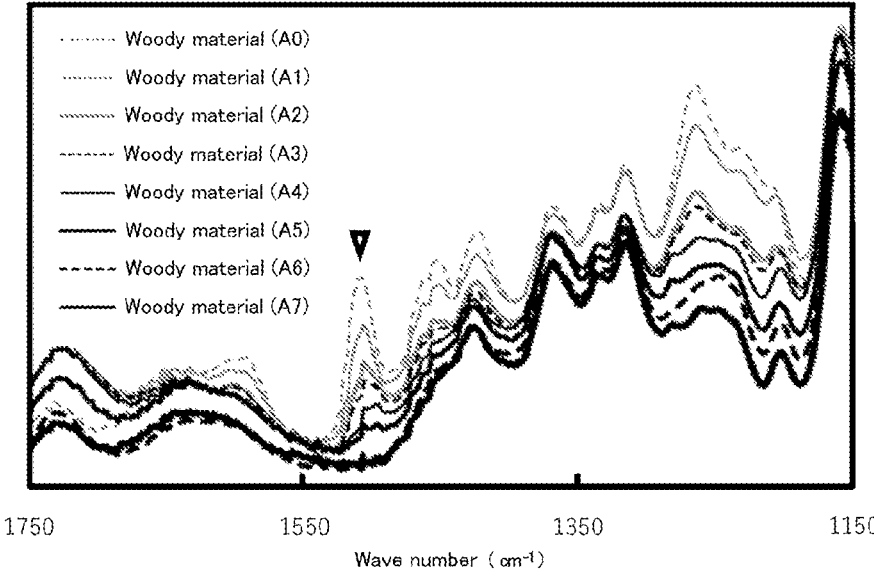
FIG. 7 is an enlarged graph of a wave number ranging from 1150 $cm^{-1}$ to 1750 $cm^{-1}$ in the ATR spectra of FIG. 6.

FIG. 6 is an ATR spectrum in a wide range (4000 cm$^{-1}$ to 500 cm$^{-1}$), and FIG. 7 is an ATR spectrum in a narrow range (1150 cm$^{-1}$ to 1750 cm$^{-1}$). From the ATR spectrum of each woody material, the ratio (H$^B$/H$^A$ ratio) of the height (H$^A$) of the absorption peak derived by the C—H stretching vibration detected at a wavenumber from 2850 cm$^{-1}$ to 2950 cm$^{-1}$ to the height (H$^B$) of the absorption peak derived by the skeletal vibration of the aromatic ring detected at a wavenumber from 1480 cm$^{-1}$ to 1540 cm$^{-1}$ was calculated. Since H$^A$ showed a small change due to the delignification treatment and H$^B$ decreased with the progress of the delignification treatment, the H$^B$/H$^A$ ratio decreased with an increase in the delignification treatment time. These results are shown in Table 2. The height of each absorption peak was determined as shown in FIGS. 2 and 3.

TABLE 2

| | | Woody material | | | | | | |
|---|---|---|---|---|---|---|---|---|
| | | A0 | A1 | A2 | A3 | A4 | A5 | A6 | A7 |
| Delignification treatment time | | 0 | 10 min | 30m in | 1 h | 3 h | 6 h | 24 h | 96 h |
| H$^B$/H$^A$ | Inside (plate surface) | 1.58 | 0.99 | 0.81 | 0.59 | 0.30 | 0.20 | 0.12 | 0.09 |
| | Surface (wood chip surface) | 1.29 | 0.96 | 0.84 | 0.83 | 0.66 | 0.48 | Unmeasured | Unmeasured |

Table 2 shows that the woody material (A0) after the water treatment had a H$^B$/H$^A$ ratio of 1.2 or more, but the H$^B$/H$^A$ ratio became 1.10 or less by performing the delignification treatment for at least 10 minutes.

Furthermore, the fluidity during wood flow molding was evaluated for the woody material (A0) after the water treatment and the woody materials (A1) to (A5) after the delignification treatment. In other words, under a heating environment with 40° C., 60° C., 80° C., or 100° C. saturated steam, the free compression test was performed in which a load was applied to each woody material up to a plastic region using two pressing plates. Specifically, the woody material was brought into the water-saturated state (water content: 200% or more), placed between the pressing plates, and compressed at 1 mm/min in an R direction.

Figures 8, 9:
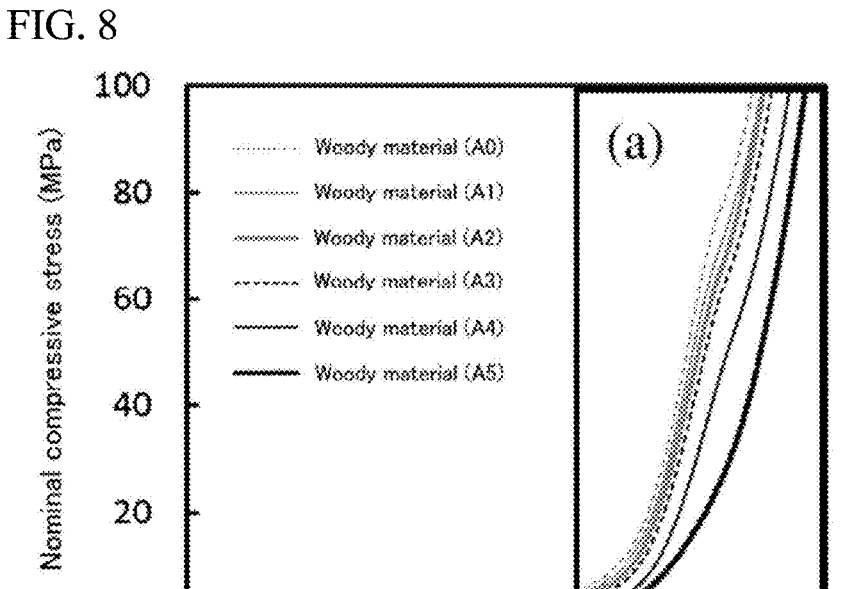
FIG. 8 is a graph illustrating a nominal compressive stress with respect to a compression ratio for fluidity evaluation related to the woody materials (A0) to (A5) obtained in EXAMPLES.
FIG. 9 is an enlarged graph of a region (a) in FIG. 8.

FIG. 8 is a graph showing the nominal compressive stress with respect to a compression ratio when 40° C. saturated steam was used. In all the woody materials (A0) to (A5), since blockage of the cell lumens due to the deformation of the cell walls of the woody material gradually continued, a region where the nominal compressive stress was almost flat was observed until the compression ratio reached about 60%. As the compression was further performed, the nominal compressive stress rapidly rose, and thereafter, a substantially constant increasing rate of the nominal compressive stress was shown, and as the compression was further performed, an inflection point at which the increasing rate of the nominal compressive stress decreased appeared (see FIG. 9 that is an enlarged view of (a) in FIG. 8). After the inflection point, since plastic deformation occurred, the increase rate of the nominal compressive stress decreased. The smaller the H$^B$/H$^A$ ratio, the smaller the nominal compressive stress at the inflection point, and it can be seen that the plastic deformation occurs with smaller stress. It is considered that since the plastic deformation occurred simultaneously with the deformation of the cell walls, and the inflection point was buried in a flat region of nominal compressive stress, the inflection point could not be detected in a case of the woody material (A5). This inflection point is a "flow starting point" at which the woody material plastically deforms and flows, and the nominal compressive stress at this time is a "flow starting stress".

Figure 10:
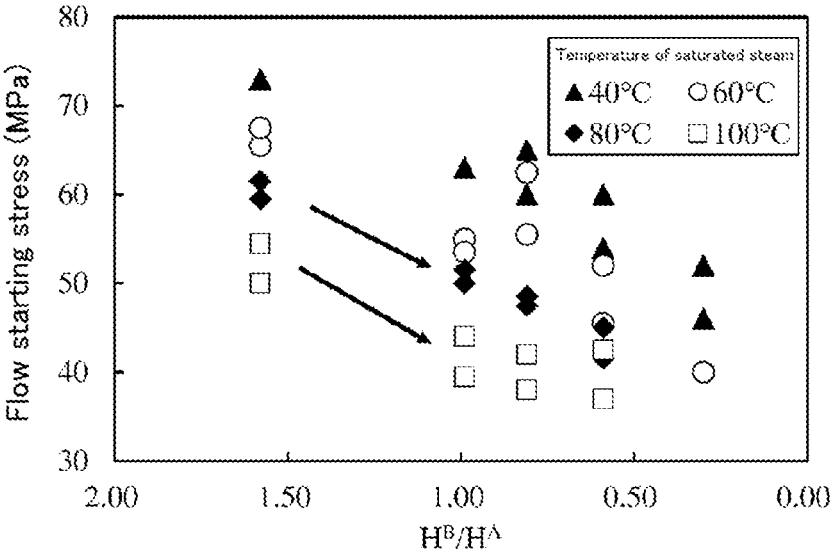
FIG. 10 is a graph illustrating changes in a flow starting stress for fluidity evaluation related to the woody materials (A0) to (A5) obtained in EXAMPLES.

FIG. 10 is a graph showing changes in flow starting stress concerning the woody material (A0) after the water treatment and the woody materials (A1) to (A4) after the delignification treatment. According to FIG. 10, it can be seen that the higher the temperature of the saturated steam (that is, the higher the temperature when heating is used in combination during wood flow molding), the lower stress the flow starts at. It was found that when the H$^B$/H$^A$ ratio was 1.00 or less, the flow starting stress decreased (that is, fluidity was improved).

Figure 11:
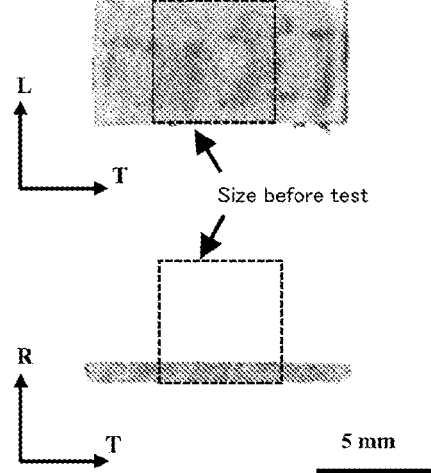
FIG. 11 is an appearance image after the shape of the woody material (A5) is fixed by performing a free compression test at a saturated steam temperature of 40° C.

The woody material in the water-saturated state after the free compression test was dried while maintaining a compressed state after the test to fix the shape. FIG. 11 is the appearance image after the shape of the woody material (A5) is fixed by performing the free compression test at the saturated steam temperature of 40° C. Through drying after pressing, a thin-walled sheet-shaped molded body having a fixed shape could be obtained. Although not shown, it was confirmed that a molded body having a fixed shape was obtained under all experimental conditions in which the H$^B$/H$^A$ ratio and the saturated steam temperature were different. An area S$_a$ was measured by binarizing the appearance image of an LT surface in the obtained molded body, and the molded body area S$_a$/W$_d$ per unit weight normalized by a dry weight W$_d$ of the molded body was calculated and used as an index of fluidity.

Figure 12:
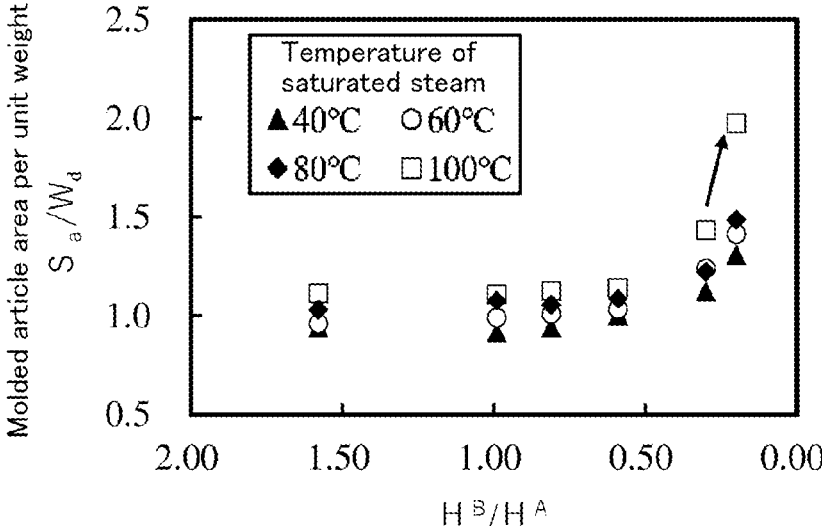
FIG. 12 is a graph illustrating a change in a molded body area per unit weight for fluidity evaluation related to woody materials (A0) to (A5) obtained in EXAMPLES.

FIG. 12 is a graph showing changes in the molded body area S$_a$/W$_d$ per unit weight with respect to the woody materials (A0) to (A5). According to FIG. 12, it can be seen that the higher the temperature of the saturated steam, the larger S$_a$/W$_d$ and the higher the fluidity. It was found that when the H$^B$/H$^A$ ratio was 0.5 or less, the S$_a$/W$_d$ was significantly increased, and the fluidity was significantly improved.

Figure 13:
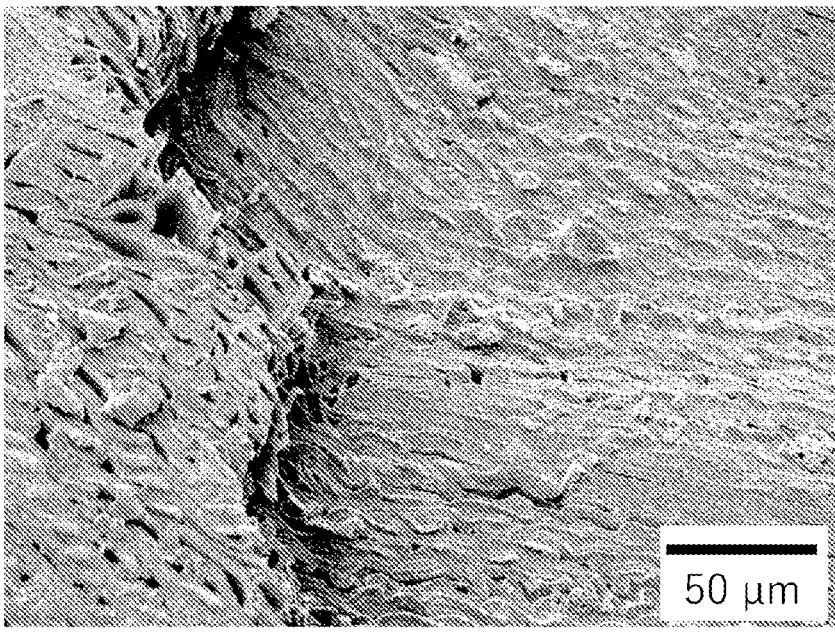
FIG. 13 is a cross-sectional image of a compressed product of the woody material (A0).
Figure 14:
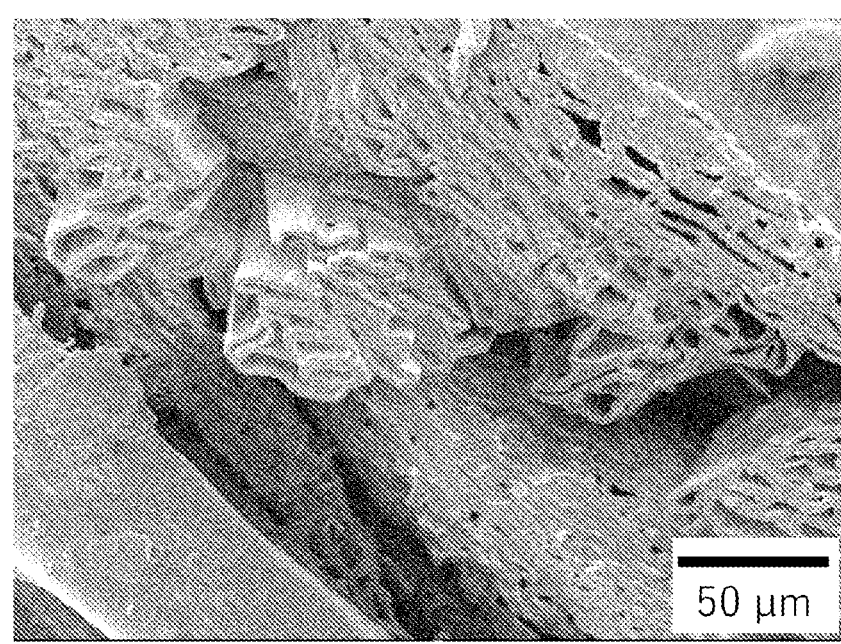
FIG. 14 is a cross-sectional image of a compressed product of the woody material (A5).

The woody material (A0) after the water treatment and the woody material (A5) after the delignification treatment were each subjected to cross-sectional observation by a scanning electron microscope of a compressed product obtained after completion of a compression test performed at a temperature of 80° C. FIG. 13 is a cross-sectional image of the compressed product of the woody material (A0), and FIG. 14 is a cross-sectional image of the compressed product of the woody material (A5). In either case, the plastic flow due to intercellular sliding occurred, but it can be seen that the woody material (A5) flowed in smaller cell units.

2. Production and Evaluation of Woody Material (2)

Sapwood (shirata) of Japanese cypress was made into small pieces having a size of 1 mm (L: fiber direction)×3 mm (T: tangential direction)×30 mm (R: radial direction), and a delignification treatment was performed on a plurality of the small pieces for 10 minutes, 30 minutes, 1 hour, 3 hours, or 6 hours in the same manner as described above to obtain woody materials (B1) to (B5). Then, the ATR spectra were measured for the wood chip surfaces of the obtained woody materials in a dry state, and the ratios ($H^B$/$H^A$ ratio) of the heights ($H^A$) of the absorption peaks derived by the C—H stretching vibration detected at a wavenumber from 2850 cm$^{-1}$ to 2950 cm$^{-1}$ to the heights ($H^B$) of the absorption peaks derived by the skeletal vibration of the aromatic ring detected at a wavenumber from 1480 cm$^{-1}$ to 1540 cm$^{-1}$ were calculated in the same manner as described above. The ratios of $H^B$/$H^A$ were respectively 1.05, 0.94, 0.91, 0.77, and 0.65 in the order of the woody materials (B1), (B2), (B3), (B4), and (B5).

ATR spectrum of a product (B0) obtained by immersing a small piece of Japanese cypress in, instead of the treatment liquid for delignification, water at room temperature for 96 hours or longer was also measured in the same manner, and the $H^B$/$H^A$ ratio was calculated and 1.24 was obtained.

Figure 15:
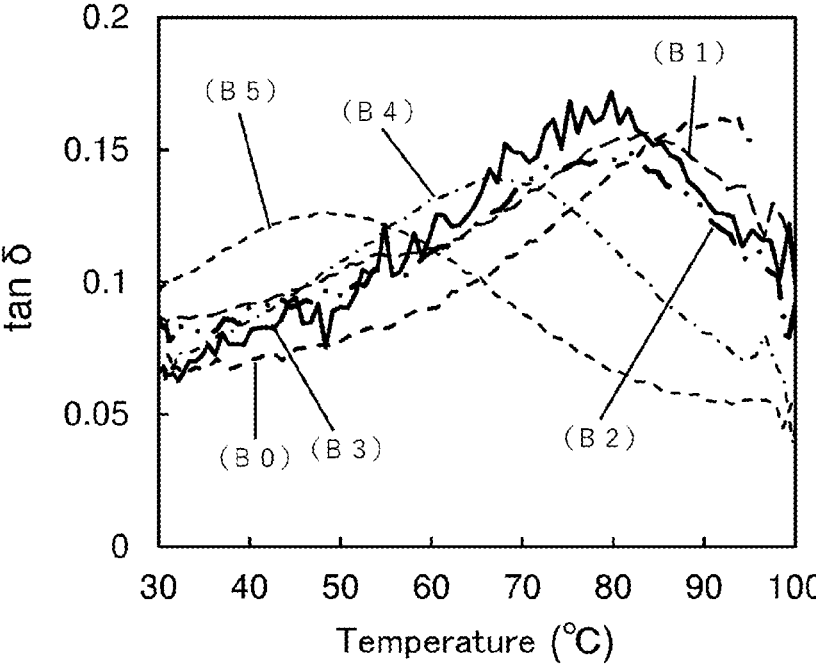
FIG. 15 is a graph illustrating tan δ relating to dynamic viscoelasticity of woody materials (B0) to (B5) obtained in EXAMPLES.

Subsequently, in order to grasp a qualitative change of lignin for the woody material (B0) after the water treatment and the woody materials (B1) to (B5) after the delignification treatment, each woody material was placed in water in the water-swollen state (water content: 200% or more), and subjected to dynamic viscoelasticity measurement in which the woody material was pulled in the R direction under the conditions of a load of 70±20 mN and a frequency of 0.01 Hz while raising the water temperature from 30° C. to 100° C. at a temperature raising rate of 0.5° C./min. FIG. 15 is a graph showing water temperature dependency of tan δ. All the woody materials had a peak in tan δ, but the temperatures (the peak temperatures) showing the peaks were different, and the peak temperatures decreased in the order of (B0), (B1), (B2), (B3), (B4), and (B5). In other words, it was found that as the $H^B$/$H^A$ ratio decreased, the peak temperature of tan δ shifted to the lower temperature side. The peak

14 and found to be 3.6%, 10.9%, 21.5%, and 25.2%, respectively. The lignin contents in the woody materials (C1) to (C4) were 26%, 20%, 13%, and 7%, respectively, as measured via the acetyl bromide method.

Figure 16:
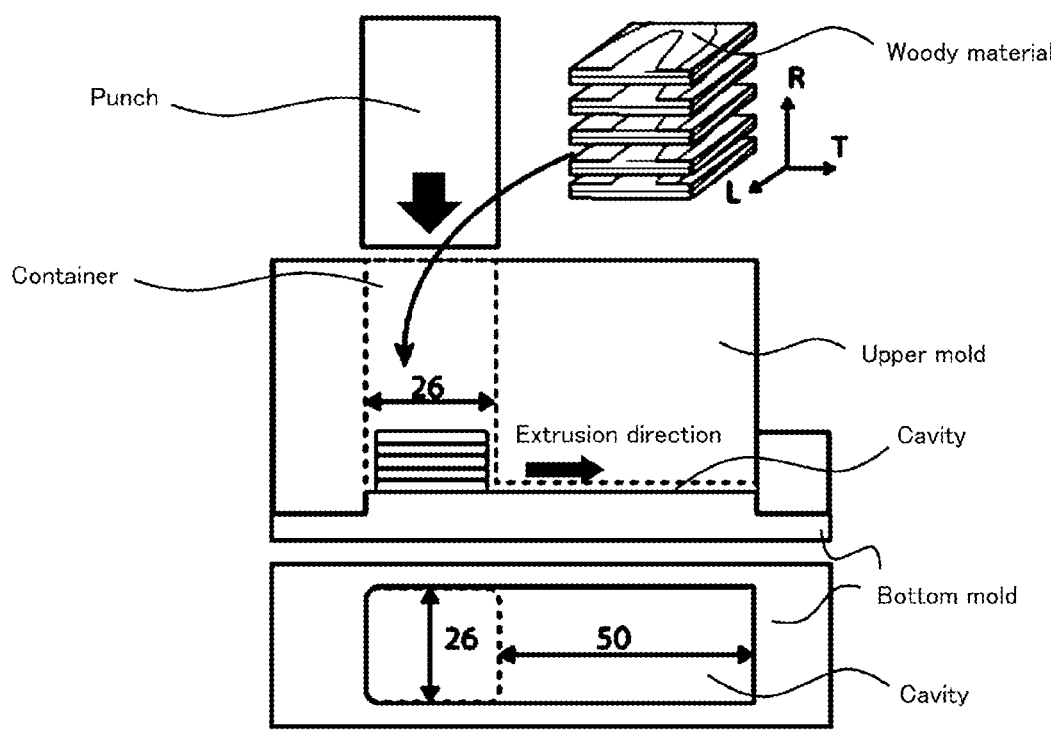
FIG. 16 is a schematic view of a side extrusion test in EXAMPLES.

Subsequently, these woody materials (C1), (C3), and (C4) were subjected to side extrusion test shown in FIG. 16 by being conditioned in an environment at a temperature of 20° C. and a relative humidity of 60% to be in an air-dried state (water content: about 9%). In other words, after the mold including an upper mold and a bottom mold was heated to a temperature of 150° C., each woody material (about 4.5 g) was placed in a container (26 mm×26 mm) so that the fiber direction (L) was orthogonal to an extrusion direction (a longitudinal direction of a cavity), and a punch was lowered to a load of 15 tons (punch surface pressure: about 220 MPa) at a constant speed (10 mm/min), whereby each woody material was extruded in a T direction into the cavity and molded. Then, the molded body was cooled after holding the pressure for 5 minutes and taken out.

Figure 17:
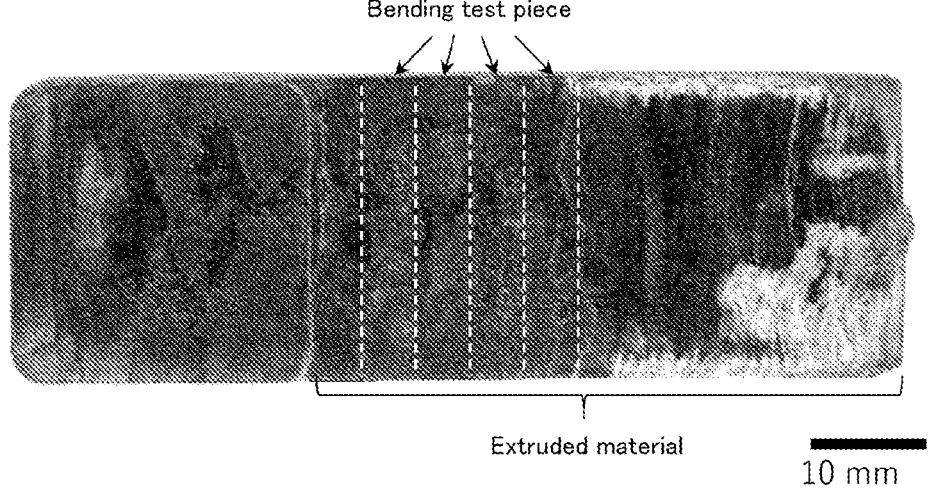
FIG. 17 is an appearance image of a molded body obtained by side extrusion of a woody material (C1) and an image illustrating how to cut out a test piece for a bending test.

FIG. 17 illustrates an appearance image of the molded body obtained by the side extrusion test, and an example of a cutting direction of the bending test piece from the extruded material (using the woody material (C1)). The cut test piece (about 26 mm×5 mm×1.2 mm) was subjected to bending test in accordance with JIS 7171 after being subjected to humidity control under an environment of a temperature of 20° C. and a relative humidity of 60%. For each woody material, the side extrusion test was performed twice, and at least five or more test specimens were subjected to the bending test.

Moreover, a (C0) obtained by immersing the Japanese cypress sliced sheets in, instead of the treatment liquid for delignification, water at room temperature for 96 hours or longer, was also subjected to the side extrusion test and the bending test in the same manner.

The results of the bending test are shown in Table 3. All data of a flexural modulus and a flexural strength was expressed as "average value±standard deviation".

TABLE 3

| | Woody material | | | | |
|---|---|---|---|---|---|
| | C0 | C1 | C2 | C3 | C4 |
| Delignification treatment time | 0 (water only) | 6 h | 15 h | 24 h | 96 h |
| Weight reduction rate (%) | — | 3.6 | 10.9 | 21.5 | 25.2 |
| Lignin content via acetyl bromide method (%) | 37 | 26 | 20 | 13 | 7 |
| Flexural modulus MOE (MPa) | 7299 ± 1752 | 7417 ± 1649 | — | 11770 ± 2801 | 11608 ± 1267 |
| Flexural strength MOR (MPa) | 45 ± 13 | 35 ± 13 | — | 74 ± 27 | 97 ± 28 | seen in each curve is due to glass transition of lignin, and shift of the tan δ peak temperature to the lower temperature side suggests a decrease in the degree of condensation of lignin. Therefore, it can be seen that when the $H^B$/$H^A$ ratio was 1.10 or less, a qualitative change such as a relaxed state in the cell walls due to a decrease in the degree of condensation of lignin occurred.

3. Production and Evaluation of Woody Material (3)

A delignification treatment was performed on a plurality of Japanese cypress sliced sheets (size: 25 mm (L: fiber direction)×22 mm (T: tangential direction)×3 mm (R: radial direction)) for a treatment time of 6 hours, 15 hours, 24 hours, or 96 hours in the same manner as described above to obtain woody materials (C1) to (C4). The weight reduction rates in these woody materials (C1) to (C4) were measured According to Table 3, bending characteristics were more excellent when the woody materials (C3) and (C4) were used than when the woody materials (C0) and (C1) were used. In other words, it was found that the mechanical characteristics of the flow molded body were good when the weight reduction rate due to delignification was 20% or more and the lignin content via the acetyl bromide method was 15% or less. It was found that even when the lignin content was 20% or more by mass as in the woody material (C1), a molded body having mechanical characteristics equivalent to those of the woody material (C0) was obtained.

4. Production and Evaluation of Wood Flow Molding Material (1)

Sapwood (shirata) of Japanese cypress was made into small pieces having a size of 5 mm (L: fiber direction)×18 mm (T: tangential direction)×18 mm (R: radial direction), and a delignification treatment was performed on a plurality of the small pieces in the same manner as described above for a treatment time of 30 minutes or 6 hours to obtain woody materials (D1) and (D2). The weight reduction rates in these woody materials (D1) and (D2) were measured and found to be 0.0% and 12.6%, respectively. In the following experiment, the woody material (D0) not subjected to the delignification treatment was also used.

In order to obtain a molding material containing a resin by impregnating the woody materials (D0), (D1), and (D2) with the resin, the woody materials (D0), (D1), and (D2) were subjected to solution replacement method (see FIG. 4) or the drying/impregnation method (see FIG. 5). As a liquid for resin impregnation, an aqueous solution obtained by dissolving the polyethylene glycol (hereinafter, referred to as "PEG20000") having an average molecular weight of 20,000 in water and having a concentration of 20% by mass (hereinafter, referred to as a "PEG aqueous solution") was used.

Specifically, in the solution replacement method, first, each woody material was brought into the water-saturated state (water content: 200% or more) immediately after the delignification treatment, and then immersed in the PEG aqueous solution at 20° C. This operation was continued for 7 days while replacing the PEG aqueous solution every 24 hours. Thereafter, the woody material was taken out from the PEG aqueous solution, cured at 35° C. and 11 RH % until the weight reached a constant weight. Then, the product was further dehydrated and dried in a vacuum dryer at 35° C. until the weight reached a constant weight, thereby obtaining each wood flow molding material.

Specifically, in the drying/impregnation method, first, each woody material in the water saturated state (water content: 200% or more) immediately after the delignification treatment was dried under the conditions of 35° C. and 11 RH % until the weight reached a constant weight, next placed on a silica gel and dried under reduced pressure, then the PEG aqueous solution was injected into each woody material in a dry state under reduced pressure conditions and immersed therein, next under pressurized conditions after 22 hours, the woody material was taken out from the PEG aqueous solution, cured under the conditions of 35° C. and 11 RH % until the weight reached a constant weight, and further dehydrated and dried in a vacuum dryer at 35° C. until the weight reached a constant weight, thereby obtaining each wood flow molding material.

For each of the materials for wood flow molding obtained above, measurement results of a weight increase rate and a swelling rate in the T direction by PEG20000 are shown in Table 4. Both the weight increase rate and the swelling rate in the T-direction are values based on the woody materials (D0) to (D2) in a dry state before being impregnated with PEG20000.

TABLE 4

| | | | | |
|---|---|---|---|---|
| Solution replacement method | Weight increase rate (%) | 43.4 | 45.8 | 48.2 |
| | Swelling rate in T direction (%) | 4.08 | 5.67 | 7.73 |
| Drying/ impregnation method | Weight increase rate (%) | 48.9 | 50.1 | 59.7 |
| | Swelling rate in T direction (%) | 3.23 | 4.09 | 6.59 |
| Woody material | | D0 | D1 | D2 |

As is apparent from Table 4, in both the solution replacement method and the drying/impregnation method, the wood flow molding material using the woody material (D2) further subjected to delignification treatment had a higher weight increase rate and a higher impregnation ratio of PEG20,000 than the wood flow molding material using the woody material (D1). Similarly, the swelling rate in the T-direction was higher in the wood flow molding material using the woody material (D2) than in the wood flow molding material using the woody material (D1), and the impregnation ratio of PEG20000 into the cell walls was high.

5. Production and Evaluation of Wood Flow Molding Material (2)

Figure 18:
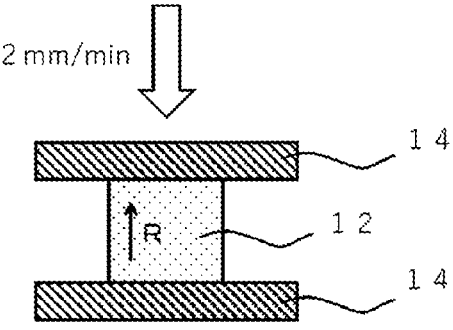
FIG. 18 is a schematic explanatory view illustrating a compression test of a wood flow molding material impregnated with PEG20000.
Figure 19:
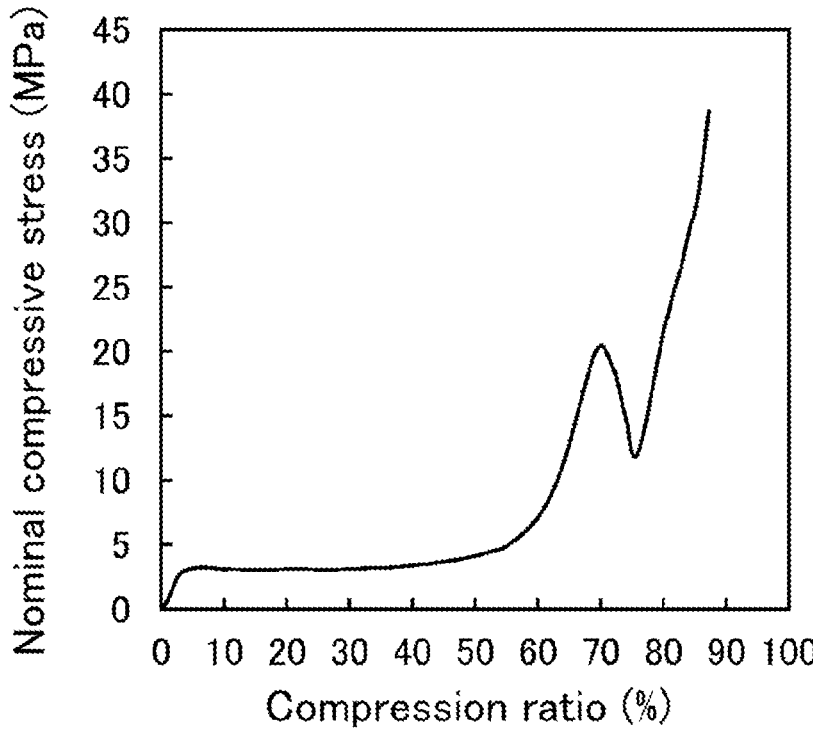
FIG. 19 is a graph illustrating a stress curve obtained by a compression test of a wood flow molding material obtained by impregnating a woody material (D0) with PEG20000.
Figure 20:
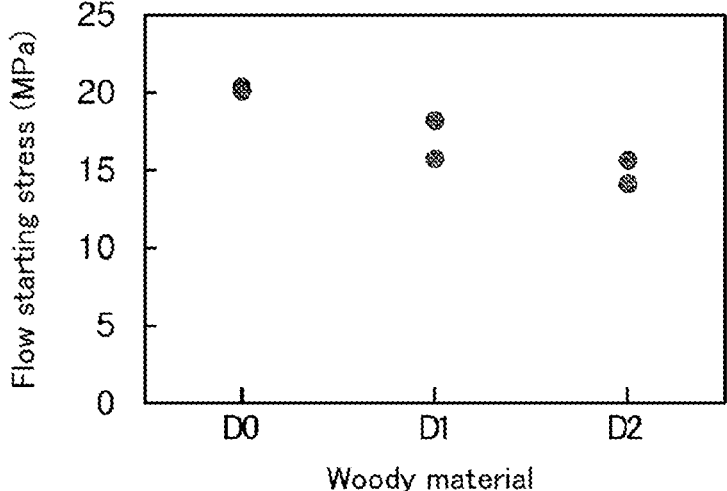
FIG. 20 is a graph illustrating the flow starting stress of a wood flow molding material obtained by impregnating woody materials (D0) to (D2) obtained in EXAMPLES with PEG20000.

The wood flow molding material (PEG20000 impregnated product) obtained via the solution replacement method was cut into a cube of about 5 mm×about 5 mm×about 5 mm, placed between two hot plates heated to a temperature of 160° C. as shown in FIG. 18 as a sample 12 for a deformation measurement, and compressed at 2 mm per minute in the R direction to measure the deformation behavior. As a result, in any of the wood flow molding materials, the stress curve as shown in FIG. 19 was obtained by the deformation measurement, the stress was yielded at a compression ratio of about 70%, thereafter, the load rose again, and the measurement was completed. Since this yield point seen along the curve is the flow starting point, the compressive stress (the flow starting stress) at the flow starting point was obtained for each wood flow molding material and graphed (see FIG. 20). From FIG. 20, it was found that the flow starting stress decreases and the fluidity increases in the order of the wood flow molding material using the woody material (D0), the wood flow molding material using the woody material (D1), and the wood flow molding material using the woody material (D2).

6. Production of Woody Molded Article

Japanese cypress sliced sheets having a diameter of 45 mm and a thickness of 4 mm were subjected to delignification treatment in the same manner as described above for 6 hours and 48 hours, respectively. Then, the sheets were dried and conditioned to obtain the woody material E (weight reduction rate: about 6%, water content: 11%) and the woody material F (weight reduction rate: about 25%, water content: 11%).

Figure 22:
FIG. 22 is a perspective image illustrating a container-shaped woody molded article obtained using the wood flow molding material (a woody material E) not containing a resin in EXAMPLES.
Figure 23:
FIG. 23 is a perspective image illustrating a container-shaped woody molded article obtained using the wood flow molding material (a woody material F) not containing a resin in EXAMPLES.

Subsequently, a container (diameter of an opening portion: about 45 mm, height: about 50 mm) illustrated in FIGS. 22 and 23 was obtained using a rear extrusion molding machine 20 illustrated in FIG. 21. In other words, in the mold 24 heated to a temperature of 170° C., a plurality of the woody materials E or F were stacked to be about 60 grams and accommodated as the wood flow molding material 22, the punch 26 was lowered at 1 mm/second, a load was applied until the maximum punch surface pressure (diameter 50 mm) reached 200 MPa, and then cooling was performed to obtain the container. As is apparent from FIGS. 22 and 23, the obtained container had wood appearance and was excellent in shape stability.

Figure 24:
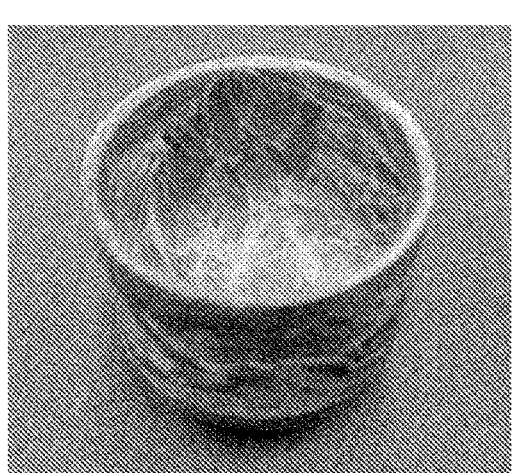
FIG. 24 is a perspective image illustrating a container-shaped woody molded article obtained using a wood flow molding material G containing a resin in EXAMPLES.

The woody material E was impregnated with a water-soluble urethane resin "E-37" (trade name) manufactured by DKS Co., Ltd. via the solution replacement method to obtain a wood flow molding material G having a weight increase rate of about 30% based on the water-soluble urethane resin. Thereafter, rear extrusion molding was performed in the same manner as in the case of using the wood flow molding material including the woody material E to obtain a container having the same shape. The obtained container was shown in FIG. 24, had wood appearance as in FIGS. 22 and 23, and was excellent in shape stability.

Furthermore, even when the PEG20000 and a terpene resin were used in place of the water-soluble urethane resin, the rear extrusion molding could be favorably performed.

INDUSTRIAL APPLICABILITY

The woody material for wood flow molding of the present invention and the wood flow molding material containing the same of the present invention are suitable for manufacturing of a woody molded article used as daily necessities, furniture/furnishings, building materials/building stuff, housings for electrical appliances or acoustic equipment, members for vehicles, and the like.

REFERENCE SIGNS LIST

1: Wood flow molding material
2: Cellulose fiber
4: Lignin
6: Water
8: Resin-containing liquid
10: Resin
12: Deformation measuring sample
14: Hot plate
20: Rear extrusion molding machine
22: Wood flow molding material 24: Mold
26: Punch

The invention claimed is:

1. A woody material, wherein:
   a ratio ($H^B/H^A$) between a height ($H^A$) of an absorption peak derived by C—H stretching vibration detected at a wavenumber from 2850 cm$^{-1}$ to 2950 cm$^{-1}$ and a height ($H^B$) of an absorption peak derived by skeletal vibration of an aromatic ring detected at a wavenumber from 1480 cm$^{-1}$ to 1540 cm$^{-1}$ is 1.10 or less in an ATR spectrum of an inside or a surface of the woody material by an infrared spectroscopic analysis method.

2. The woody material according to claim 1, wherein a lignin content by an acetyl bromide method is 3% or more by mass.

3. The woody material according to claim 2, wherein the lignin content is 20% or more by mass.

4. The woody material according to claim 2, wherein the lignin content is 15% or less by mass.

5. A wood flow molding material comprising the woody material according to claim 1.

6. The wood flow molding material according to claim 5, further comprising a resin.

7. A manufacturing method of a wood flow molding material, comprising:
   impregnating the woody material according to claim 1 with a resin.

\* \* \* \* \*